Sept. 1, 1959 W. KRAMER 2,902,178
MATERIAL HANDLING APPARATUS
Filed Aug. 8, 1958 3 Sheets-Sheet 1
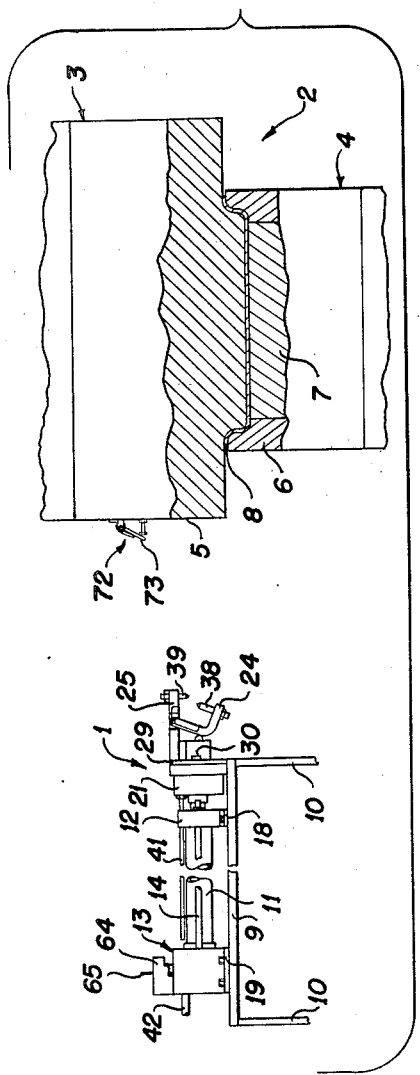
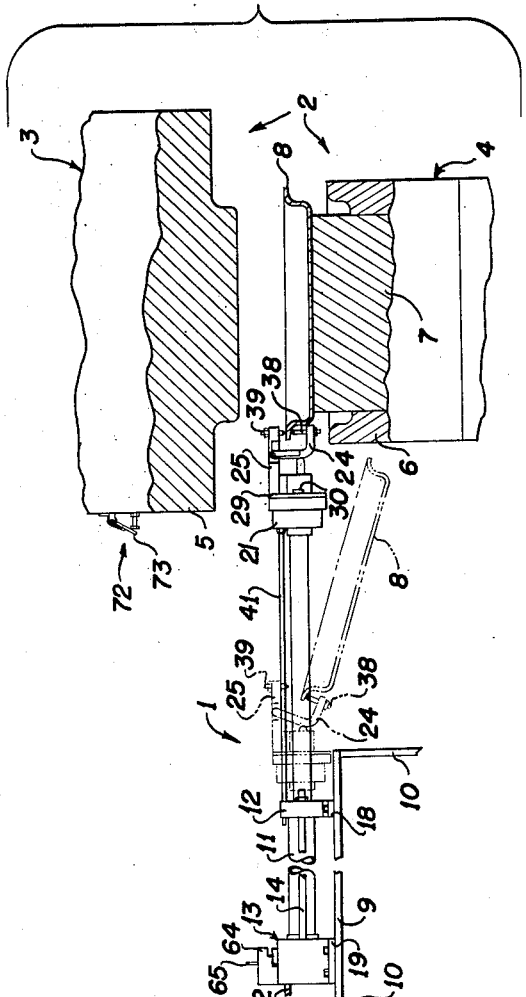
INVENTOR.
WALDEMAR KRAMER
BY
Andrus & Starke
Attorneys

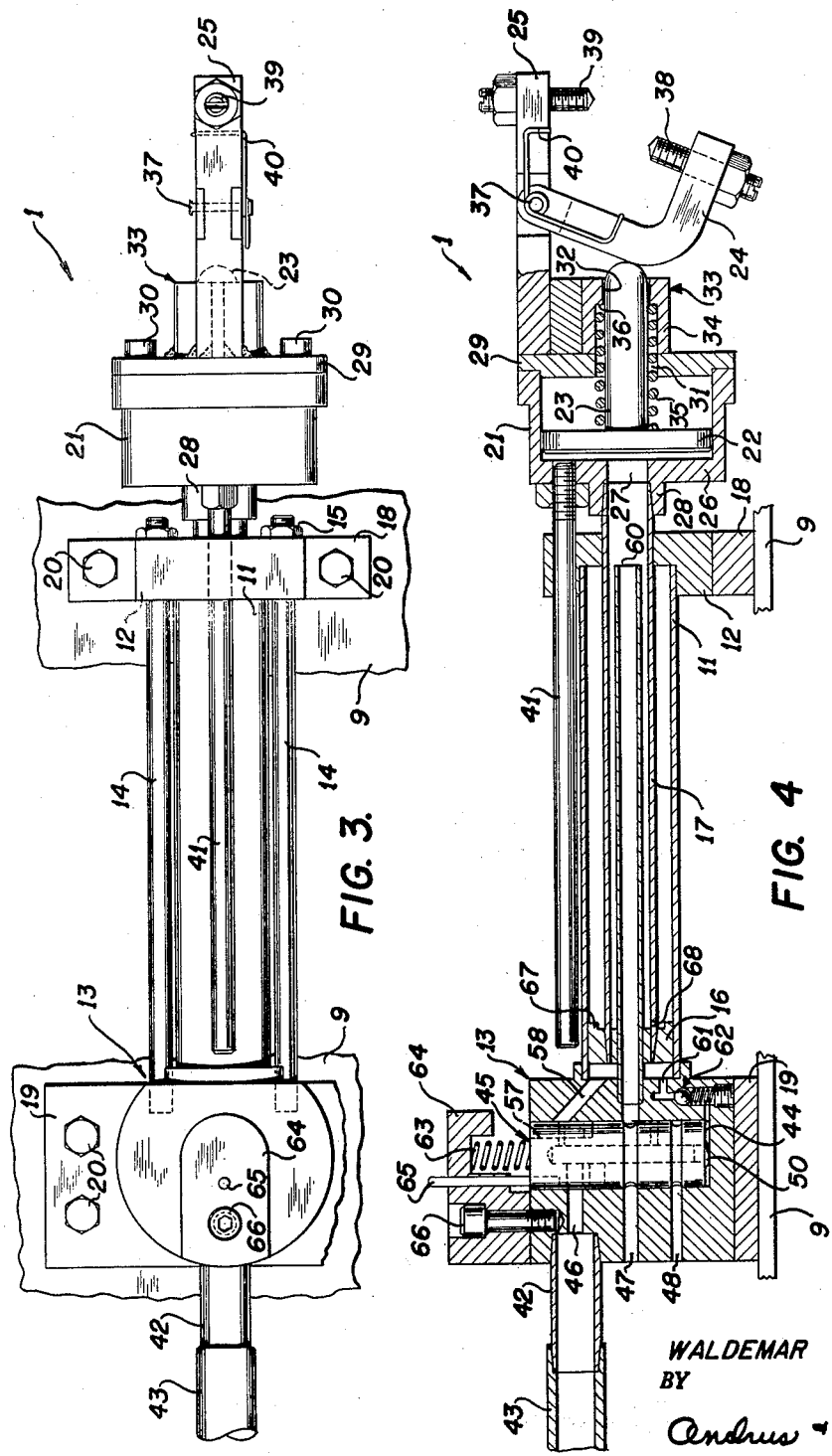

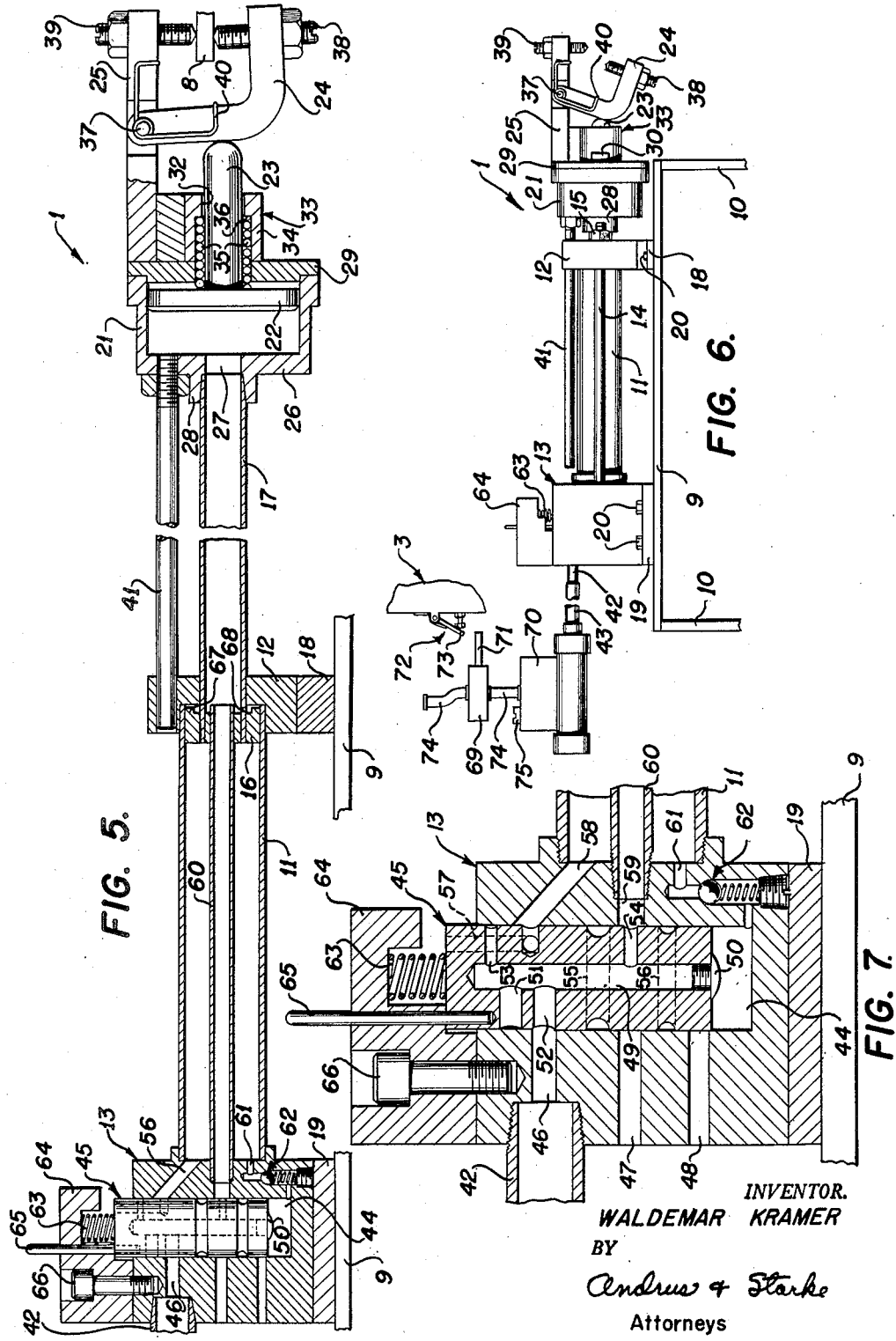

United States Patent Office 2,902,178
Patented Sept. 1, 1959

2,902,178

MATERIAL HANDLING APPARATUS

Waldemar Kramer, Milwaukee, Wis., assignor to A. O. Smith Corporation, Milwaukee, Wis., a corporation of New York Application August 8, 1958, Serial No. 753,933

11 Claims. (Cl. 214—1)

This invention relates to a material handling apparatus and in particular to an apparatus for automatically feeding and withdrawing a workpiece from a forming machine.

In the operation of forming machines, a material handling apparatus is often employed to feed and/or withdraw the workpiece from the machine for efficient and economical operation of the machine and for increased employee safety.

Frequently, it is necessary to transfer the material handling apparatus from one machine to another, particularly where there are forming machines which are only operated intermittently to form a relatively small number of parts. Under such circumstances it may not be economical to equip each machine with such an apparatus. Furthermore, apart from economical considerations, space limitations may render it difficult or impractical to so equip each forming machine.

Since, in general, these devices are bulky in structure and are rather difficult to disassemble, move, and re-assemble, the transfer results in one or more forming machines standing idle for a period of time, reducing production time.

In addition, a material handling device suitable for use at one particular forming machine may not be usable at another without considerable adaptation or modification due to the configuration of the machine or the handling device and/or due to a lack of the required type of controls and/or due to lack of the required number of air or other fluid connections for the device at the machine.

The present invention provides an improved material handling apparatus particularly adapted to be readily transferred from one forming machine to another and adapted to be conveniently mounted upon or adjacent to the machine.

In accordance with the invention, work handling members are mounted for reciprocatory movement relative to a forming machine or the like. The work handling members are adapted to handle or receive a workpiece stamped from the machine upon extension to the machine, and to release the workpiece when the members are subsequently retracted.

The work handling members are supported for movement by a fluid actuated drive mechanism which is connected to a suitable source of fluid through a conduit system. Fluid flow to the drive mechanism is controlled by the operation of the forming machine such that when the forming machine is in the open position, having previously stamped a workpiece, fluid is directed to one side or face of the fluid actuated drive mechanism to extend the work handling members to the machine to receive the workpiece.

The conduit system is provided with valve means which is automatically actuated when the handling members are extended to the forming machine to direct fluid to the opposite side of the drive mechanism and retract the work handling members from the machine causing the members to release the workpiece. The forming machine may now be actuated to stamp another workpiece and to cause the above cycle of operations to be repeated.

An object of the invention is to provide a material handling apparatus which is of simple and rugged construction and which may be conveniently and readily transferred from one forming machine to another.

Another object of the invention is to provide a material handling apparatus which requires but a single fluid connection and which further requires only a short surge of fluid under pressure for each complete operating cycle.

Another object of the invention is to provide a material handling apparatus having valve means integral therewith for automatically directing fluid to the various cylinders and pistons of the apparatus.

A further object of the invention is to provide a material handling apparatus which is automatically actuated by the motion of the forming machine by means of a simplified, inexpensive mechanism.

Further objects of the invention will appear in the course of the following description.

The drawing illustrates the best mode presently contemplated of carrying out the invention.

In the drawing:

Figure 1 is a side elevation of the apparatus shown in connection with a forming device with the latter being shown diagrammatically in vertical section;

Fig. 2 is a view similar to Fig. 1, showing the apparatus in the process of gripping the workpiece after the latter has been released from the forming device, and showing the retracted position of the apparatus in dashed lines;

Fig. 3 is a top plan view of the apparatus of the invention;

Fig. 4 is a side elevational view, partly in section, of the apparatus;

Fig. 5 is a view similar to Fig. 4 but with the apparatus in the extended position;

Fig. 6 is a diagrammatic representation of the apparatus illustrating a typical mechanism employed to control the operation of the apparatus; and Fig. 7 is an enlarged view in section of the valve and valve housing.

Referring to the drawings, the apparatus 1 of the invention is adapted to be mounted adjacent a press 2 or the like which comprises, in general, a movable ram 3 and a fixed bed 4. The ram carries a suitable punching die 5 and the bed of the press supports a complementary female die 6. This latter die is provided with a knockout portion 7 which at the proper time releases or raises a workpiece 8 relative to the bed of the press.

The material handling apparatus 1 is supported on a platform 9 having upright legs 10.

The material handling apparatus 1 of the invention includes a cylindrical member 11 supported at the ends by means of a collar 12 and a valve housing block 13, respectively, and secured therebetween by a pair of elongated rods 14. One end of each rod is threaded into block 13 and the other end extends through an opening in collar 12 and is provided with a nut 15 to maintain the collar tightly against the end of member 11. Slidably mounted within member 11 is a piston 16, and one end of a cylindrical tube 17 is attached to piston 16 and is spaced coaxially inwardly from member 11. The other end of tube 17 projects forwardly through a suitable opening in collar 12.

The lower portions of collar 12 and valve housing block 13 are provided with flanges 18 and 19, respectively, through which bolts 20 extend for securement to platform 10. If desired, suitable clamps, not shown, may be used either to replace bolts 20 or in conjunction therewith to secure the apparatus to the platform.

In operation, piston 16 together with tube 17 is adapted to be moved within member 11 relatively toward and away from the press when subjected to air or other suitable gas pressure. To this end the forward portion of tube 17, relative to the press, is provided with a work gripping mechanism adapted to engage and grip the work when the tube is extended to the press. The work gripping mechanism includes a cylinder 21 secured to the outer end of tube 17 and a piston 22 slidably mounted therein. The piston carries a piston rod 23 and reciprocation of the rod actuates a pivotable lower jaw 24 which cooperates with a fixed upper jaw 25 to grip the workpiece.

The inner end wall 26 of cylinder 21 is provided with a centrally disposed opening 27 surrounded by an outwardly extending annular flange 28 which is threadably secured to the outer end of tube 17. Opening 27 provides communication between tube 17 and cylinder 21 to allow air in tube 17 to be directed to piston 22. The outer end of cylinder 21 is enclosed by a head 29 which is secured to the cylinder by screws 30 or the like.

The head 29 of the cylinder is provided with a centrally disposed opening 31 which is aligned with a similar opening 32 in an annular support member 33 extending outwardly from head 29. Piston rod 23 extends outwardly through the aligned openings 31 and 32 with a clearance being provided between the rod and opening 32 and between the rod and the annular wall 34 of member 33 to receive a coil spring 35. The spring is adapted to oppose outward motion of piston 22 and extends between piston 22 and an internal shoulder 36 formed in member 33.

The previously referred to jaws 24 and 25 are secured to cylinder 21 for movement therewith with the upper jaw 25 extending in a horizontal direction from cylinder head 29 and with the lower jaw 24 pivotally supported intermediate the length of jaw 25. The jaw 24 is substantially L-shaped and has a bifurcated upper end attached by a pin 37 to a narrowed portion of upper jaw 25. The outer or free ends of the lower and upper jaw are provided with set-screws 38 and 39, respectively, with the shanks of the screws depending toward each other and adapted to engage each other as jaw 24 is pivoted upwardly.

With piston 22 in its rear-most position, relative to head 29, rod 23 is in contact with lower jaw 24 and, as piston 22 is caused to move outwardly or toward head 29, jaw 24 is pivoted about pin 37 moving set-screw 38 upwardly and toward set-screw 39 of jaw 25 to grip workpiece 8 therebetween. The workpiece, as shown in Fig. 2, has been raised out of the bed of the press by the knockout portion 7 of female die 6 and thus may be conveniently withdrawn from the press. As the work gripping members are withdrawn from the forming press and pressure on piston 22 is relaxed, spring 35 biases the piston inwardly to allow the lower jaw to pivot downwardly to thereby release workpiece 8. A suitable container, not shown, disposed beneath the retracted position of the work gripping members, is adapted to receive the released workpiece.

A spring member 40, associated with the upper and lower jaws as shown in Figs. 3 and 4, aided by gravity forces jaw 24 against the retracted rod 23 to maintain the jaws in the fully open position for subsequent extension to the press.

A rod 41, disposed radially outwardly from member 11 and parallel thereto, extends through a suitable opening in collar 12 and is threaded into cylinder 21 and, as tube 17 is extended to the press, rod 41 is free to slide within collar 12, thus removing a portion of the weight of the extended work gripping mechanism from tube 17. Rod 41 serves the further purpose of maintaining the work gripping mechanism in operative position as tube 17 is otherwise free to rotate within member 11.

The pistons 16 and 22 are adapted to be actuated by air or other suitable gas which is introduced into the apparatus through a conduit 42 secured within an opening in block 13. Conduit 42, in turn, is adapted to communicate with a source of compressed air, not shown, through supply line 43.

The block 13, in general, is provided with a centrally disposed recess 44, a plurality of passages communicating with recess 44, and a valve 45 slidably mounted in the recess. The valve 45 is also provided with a plurality of passages and is adapted to selectively permit registry of the various passages in block 13 and valve 45 to allow air to flow to the various parts of the apparatus from conduit 42 and to allow air to escape from the apparatus in the desired operational sequence.

Recess 44 is cylindrical in shape and, as shown in Fig. 7, extends vertically from the upper surface of block 13 to the lower end of the block. Valve 45 has a corresponding cylindrical shape and is adapted to be moved in a vertical direction within recess 44.

Air is admitted to recess 44 from conduit 42 through a horizontally extending passage 46 disposed in block 13. A pair of vertically spaced parallel passages 47 and 48 are disposed below passage 46 to permit communication between the recess 44 and the atmosphere.

As shown in Fig. 7, valve 45 is provided with an axial passage 49 extending upwardly from the bottom surface of the valve substantially the length of the valve. The bottom of passage 49 is closed by a plug 50 or the like which protrudes below the bottom of valve 45 and serves to support the valve above the bottom of recess 44 when the valve is in the down position.

Extending radially from passage 49 are passages 51 and 52 disposed on the left side of valve 45, as shown in Fig. 7, and passages 53 and 54 disposed on the right side of the valve. The passages 51 and 52 are positioned relative to one another such that with the valve in the down position, relative to the recess 44, passage 51 registers with passage 46 of the block and with the valve in the up position, passage 52 registers with passage 46. Passage 54 registers with central passage 49.

The valve is also provided with a pair of circumferentially extending grooves 55 and 56 disposed in the lower portion of the valve. With valve 45 in the down position, groove 55 registers with passage 47 disposed in block 13 and groove 56 registers with passage 49.

The upper surface of the valve is provided with a vertically extending passage 57 which extends downwardly and then radially to the periphery of the valve.

The inner or right side of block 13, as shown in Fig. 7, is provided with a series of passages adapted to permit flow of air therethrough. The upper portion of block 13 contains an angularly extending passage 58 which permits communication between the inner end of member 11 and passage 53 when the valve is in the down position. With the valve in the up position, passage 58 registers with passage 57 to permit communication between member 11 and the atmosphere.

A second passage 59 disposed below passage 58 receives the end of a tube 60 which extends through an opening in the center of piston 16 and coaxially through tube 17 substantially the length of the retracted position of the latter. Passage 59 is adapted to register alternately with groove 55 and passage 54 of valve 45. Thus, with the valve in the normal or down position, tube 60 is in communication with the atmosphere through passage 59, groove 55 and passage 47, and with the valve in the up position, tube 60 is in communication with the source of air through passages 59, 54, 49, 52, 46 and conduit 42.

Movement of valve 45 is effected by air which is directed to the bottom of recess 44 and to valve 45 through a passage 61 disposed in the bottom portion of block 13. The passage 61 provides communication between the inner end of member 11 and the bottom of recess 44 and directs air from member 11 to the underside of valve 45 which is supported above the bottom of recess 44 by plug 50. As the pressure builds up in member 11 and beneath valve 45 the valve will be raised automatically to its uppermost position. Air flow out of recess 44 through passage 61 is prevented by means of check valve indicated generally at 62.

Upward movement of valve 45 is resisted by a coil spring 63 disposed on the upper surface of the valve and which is retained in position by a cap-like member 64 having a suitable recess in its underside to receive the spring. The member 64 is further provided with a pin 65 extending through member 64 and into valve 45 to prevent the valve from rotating within recess 44, thus maintaining the various passages in valve 45 in position to insure proper functioning of the apparatus. Member 64 is secured to block 13 by a screw 66 or the like.

In operation with valve 45 in the normal or down position relative to recess 44, air is admitted to block 13 through conduit 42 and is initially directed to the inner end of member 11 through the passages 46, 51, 49, 53 and 58. A portion of the incoming air tends to enter the clearance which is provided between valve 45 and recess 44 where it is bled to the atmosphere by means of passages 47 and 48 in block 13. Premature pressure build-up under valve 45 is thus prevented.

As air flows to member 11, pressure will build up therein and be equally and simultaneously applied to piston 16 and to the bottom of valve 45 through passage 61. Due to the respective areas of piston 16 and valve 45 exposed to the air and the force required to move each, the piston is initially actuated and is moved outwardly toward the forming machine. The outer face of piston 16 is provided with an annular projection 67 which engages collar 12 to prevent further outward movement of the piston and which provides a clearance or space between the extended piston and the collar.

Pressure continues to build up within tube 11 and beneath valve 45 until the force exerted upon the valve is sufficient to move the same upwardly relative to block 13 with the upward movement being limited by member 64. Gas flow from conduit 42 to tube 60 is now established through the passages 46, 52, 49, 54 and 59 and further flow into the inner end of member 11 is prevented. With the valve in the upper position, passage 57 is aligned with passage 58 of the block to allow air within member 11 to escape to the atmosphere to thereby lower the pressure on the inner face of the piston 16 to that of the atmosphere. Valve 45 is prevented from moving downwardly within recess 44 by means of the entrapped air held therein by check valve 62.

Gas flow through tube 60 establishes a pressure build-up in the extended tube 17 which is simultaneously applied to the piston 22 and to the outer face of piston 16. However, due to the relatively small outer surface area of piston 16 initially exposed to the pressure buildup and the relative force required to actuate pistons 16 and 22, piston 22 is initially actuated to thereby close the jaws on workpiece 8.

Immediately thereafter, the continued pressure build-up within tube 17 exerts a force on the outer face of piston 16 sufficient to move the same inwardly and towards block 13 against the atmospheric pressure on the inner face of piston 16. Additional pressure is applied to the outer face of piston 16 by means of continuous air passage through an opening 68 which is provided in that portion of tube 17 disposed adjacent piston 16 and in the clearance between the extended piston 16 and collar 12, as shown in Fig. 5. The gripping mechanism together with the workpiece is thus withdrawn from the machine and the piston returned to its initial position adjacent block 13.

During the retraction of the piston 16, the flow of air through conduit 42 is stopped to prevent further flow of gas to tube 60. Air under valve 45, aided by the downward bias of spring 63 and the weight of the valve, is gradually and continuously being forced into the clearance between the valve and the recess and out passage 48 of block 4 to permit valve 45 to move automatically to the down position. When valve 45 is seated in recess 44, groove 55 is aligned with passages 47 and 59 whereupon air pressure on the outer face of piston 16 is relieved to the atmosphere through tube 60. The unopposed bias of spring 35 causes the jaws 24 and 25 to relax their grip on the workpiece and the same is dropped into the container. The apparatus of the invention is now ready for another cycle.

The air supply need be operatively connected to the apparatus for a relatively short period of time, on the order of two to five seconds, and the entire operating cycle is completed with an additional few seconds. Thus, even though air is continuously escaping from the recess, the valve is held in the up position long enough to allow sufficient air flow through tube 60 to actuate pistons 16 and 22 in the manner described.

The apparatus may be operated by a control mechanism such as that shown in Fig. 6, which may be mounted on the frame of the press. The control mechanism comprises, in general, a valve 69 adapted to be actuated by the ram of the press, a pilot valve 70 adapted to furnish a timed supply of air to the apparatus when valve 69 is actuated, and a series of lines connecting a supply of air to the various components of the control mechanism and to the material handling device.

The valve 69 is provided with a lever 71 which projects into the path of a roller tripper 72 mounted on the side of ram 3. The roller tripper is provided with a pivoted, spring biased arm 73 which is adapted to move lever 71 upwardly when the ram is correspondingly moved. Upward movement of the lever actuates valve 69 to thereby operatively connect the air supply, not shown, to the material handling apparatus through lines 74, valve 69, pilot valve 70 and line 43. The arm of the roller tripper rolls over lever 71 without actuating the same when the ram descends.

As generally the press is actuated by air, the air ejection circuit of the press may conveniently serve as the gas supply for the material handling device. The pilot valve is of the type well known in the art, and is adapted to allow a timed supply of gas to pass therethrough. At the end of the desired time, the pilot valve automatically stops the flow of gas to the apparatus. A bleeder screw 75 disposed on the pilot valve 70 permits simple adjustment of the length of the timed gas supply.

The material handling device of the invention is operatively connected to the gas supply for a relatively short duration, during which time sufficient gas is admitted to the apparatus to cause the same to extend to the press, grip the workpiece, and withdraw and drop the workpiece onto a conveyor or the like. The complete cycle of the device is, therefore, relatively short in duration and requires but a relatively small amount of gas, at a relatively low pressure, for its operation.

Other mechanisms may be utilized to control the apparatus of the invention and give equally satisfactory results. However, the control mechanism as described represents a relatively, inexpensive, standard-type structure which is simple in operation and which is automatically actuated by the movement of the press. Such simplified controls are possible due to the construction of the valve housing and its attendant valve which automatically function to direct gas to the various parts of the apparatus in the desired sequence.

If desired, a second apparatus of the type described may be used to load the blanks into the press.

The apparatus may be readily installed or removed from a press, making it convenient to transfer the apparatus from one location to another.

The apparatus is featured by the use of a single fluid inlet connection to the apparatus thereby minimizing the number of conduits and attendant coupling means required to interconnect the gas supply to the various cylinders and pistons of the apparatus. Fluid lines which might interfere with the operation of the press or might otherwise present installation difficulties are thus eliminated.

Various modes of carrying out the invention are contemplated as being within the scope of the following claims particularly pointing out and distinctly claiming the subject matter which is regarded as the invention.

I claim:

1. In a material handling apparatus for a forming machine or the like, material handling members adapted to receive material from the forming machine when extended to the machine, a support member to support said material handling members, fluid actuated drive means to extend and retract said support member relative to said forming machine, conduit means for establishing communication between a source of fluid and the opposite end portions of said drive means, fluid actuated valve means operatively associated with said conduit means for permitting alternate flow of fluid through said conduit means to said opposite end portions of said drive means, and means for directing fluid flowing to one end portion of said drive means back to said valve means whereby fluid is simultaneously directed to said end portion of said drive means and to said valve means with the drive means being initially actuated to extend the support member and material handling members relative to the forming machine and said valve means being subsequently actuated to direct fluid flow to the opposite end portion of said drive means to thereby actuate said drive means and retract said support member and material handling members relative to said forming machine.

2. In a material handling apparatus for a forming machine or the like, a pair of jaws adapted to close to grip material from the forming machine and to open to release the material, a support member to support said jaws, fluid actuated reciprocating drive means for extending and retracting said support members relative to said forming machine, a source of fluid, first and second conduit means for establishing communication between said source of fluid and opposite end portions of said drive means respectively, valve means operatively associated with said first and second conduit means for sequentially permitting fluid flow through said first and second conduit means, said valve means being normally disposed to permit fluid flow through said first conduit means to an end portion of said drive means whereby said drive means is actuated to extend said support member and jaws to the forming machine, fluid by-pass means associated with said valve means for returning a portion of the fluid from said end portion of the drive means to said valve means to actuate said valve means when said jaws are extended relatively to the machine and thereby permit fluid flow through said second conduit means to the opposite end portion of said drive means whereby said drive means is actuated to retract said support member and said jaws from the forming machine, means responsive to the support member reaching its extended position for closing said jaws to grip the material from the forming machine, and means responsive to the support member reaching its retracted position for opening said jaws to release the material.

3. In a material handling apparatus for a forming machine or the like, a pair of jaws normally biased in an open position and adapted to close to grip material from the forming machine and to open to release the material, fluid acutuated means associated with the jaws for selectively closing and opening said jaws, a support member to support said jaws and said fluid actuated means, fluid actuated drive means for extending and retracting said support member relative to the forming machine, conduit means for establishing communication between a source of fluid and the inner and outer ends of said drive means, fluid actuated valve means operatively associated with said conduit means for effecting alternate flow of fluid through said conduit means to the inner and outer ends of said drive means, fluid by-pass means for directing fluid flowing to the inner end of said drive means to said valve means, and means for directing fluid flowing to the outer end of said drive means to the fluid actuated means associated with said jaws, said valve means being normally disposed to permit fluid flow to the inner end of said drive means whereby fluid is simultaneously directed to said drive means and valve means, said drive means being initially actuated to extend said support member and said jaws to the forming machine with said valve means being subsequently actuated to permit fluid flow to the outer end of said drive means whereby fluid is simultaneously directed to said drive means and fluid actuated means, said fluid actuated means being initially actuated to close said jaws to grip material from the forming machine and said drive means being subsequently actuated to retract said support member and said jaws from the forming machine.

4. In a material handling apparatus for a forming machine or the like, a cylindrical member, a piston slidably disposed in said cylindrical member and adapted to be moved within said cylindrical member relative to said forming machine, a support member having its inner end portion secured to said piston for movement therewith and spaced coaxially inwardly from said cylindrical member, material handling members secured to the outer end of said support member for movement therewith and adapted to receive material from the machine, a valve housing block secured to the inner end portion of said cylindrical member with said valve housing being provided with a recess and a connection to a source of gas pressure, said valve housing being further provided with a plurality of passages communicating with the gas connection and the inner end portion of said cylindrical member through said recess, conduit means associated with said valve housing for establishing communication between said recess and the outer end of said cylindrical member, and valve means movably disposed in said recess for alternately permitting gas flow to the inner and outer ends of said cylindrical member through said passages and conduit means respectively, said valve being normally disposed to effect gas flow to the inner end of said cylindrical member whereby said piston and support member together with said material handling members are moved to the forming machine and a pressure buildup is established in the inner end of said cylindrical member, said valve housing being further provided with a passage communicating with said recess and the inner end portion of said cylindrical member whereby said pressure buildup is applied to said valve means to move the same and establish gas flow through said conduit means to the outer end of said cylindrical member to move said pistons and associated members away from the forming machine.

5. In a material handling apparatus for a forming machine having a stationary bed and a movable ram, a pair of coaxially disposed tubular members, a piston slidably disposed in the outer of said tubular members and adapted to move within said outer tubular member toward and away from said forming machine, said piston being provided with an opening to receive the inner of said tubular members, a third tubular member having its inner end portion secured to said piston for movement therewith and disposed in coaxial relation between the outer and inner tubular members, material handling members secured to the outer end of said third tubular member for movement therewith and adapted to handle material from said forming machine when extended to the machine, a source of gas, a valve housing block secured to the inner end portions of said pair of coaxially disposed tubular members with said valve housing being provided with a recess and a connection to the source of gas, said valve housing being further provided with a plurality of passages communicating with the gas connection and the inner end portions of said pair of coaxially disposed tubular members through said recess, a valve movably disposed in said recess to alternately permit gas flow to the inner end portions of each of said pair of coaxially disposed tubular members, said valve being normally disposed to permit gas flow to the inner end of the outer of said tubular members whereby said piston and attached tubular member together with said material handling members are extended outwardly to the forming machine and a pressure buildup is established in the inner end of the outer of said tubular members, said valve housing being further provided with a passage communicating with said recess and the inner end of the outer of said tubular members whereby said pressure buildup is applied to said valve to actuate the same and gas flow is established to the inner end of the inner of said tubular members causing said piston to be retracted from said forming machine, and means responsive to the position of said movable ram for operatively connecting said source of gas to said gas connection for a given period of time.

6. In a material handling apparatus for a forming machine, comprising a first tubular member, a first piston disposed in said first tubular member and adapted for movement relatively toward and away from said forming machine, a second tubular member disposed within said first tubular member and having its inner end secured to said first piston for movement therewith, a cylinder secured to the outer end of said second tubular member and communicating with said second tubular member, a second piston slidably disposed in said cylinder with said piston being provided with a piston rod projecting outwardly therefrom, a pair of jaws secured to said cylinder with one of said jaws being pivotally mounted with respect to the other of said jaws and disposed in alingment with said piston rod whereby as said second piston is moved outwardly within said cylinder, said pivotal jaw is moved relatively toward the other of said jaws to grip material from the forming machine, means associated with said piston for biasing said second piston inwardly, a valve housing secured to the inner end of the first tubular member, said valve housing being provided with a recess and a series of passages providing communication between said recess and a connection to a source of gas pressure and between the recess and the inner end of the first tubular member, conduit means associated with said valve housing for establishing communication between said recess and the interior of the second tubular member, gas actuated valve means movably disposed in said recess for alternately permitting gas flow from the gas pressure connection to the inner end of said first tubular member through said passage and from the gas pressure connection to the interior of said second tubular member through said conduit means, said valve means being normally disposed to permit gas flow from the gas pressure connection to the inner end of said first tubular member whereby said first piston together with said second tubular member and second cylinder are moved to the forming machine and a pressure buildup in said first tubular member is established, said valve housing being further provided with a passage communicating with the inner end of said first tubular member and said recess whereby said pressure buildup is applied to said valve means to actuate the same with the actuation of the valve means effecting gas flow to the interior of said second tubular member whereby gas pressure is applied simultaneously to said first and second pistons, said second piston being initially moved outwardly to thereby cause said jaws to grip material from the forming machine and said first piston being subsequently moved inwardly and away from said forming machine, and means to relieve the gas pressure from the interior of the second tubular member when first piston is substantially moved away from said forming machine to permit said jaws to open to release the material.

7. In a material handling apparatus for a forming machine or the like, a cylindrical member, a pressure responsive member slidably disposed in said cylindrical member and adapted to be moved relatively toward and away from said forming machine, a support member spaced coaxially inwardly from said first tubular member with the inner end portion of said support member secured to said pressure responsive member for movement therewith, a valve housing secured to the inner end portion of said cylindrical member with said valve housing being provided with a recess and a connection to a source of gas, said valve housing being further provided with passages leading from said gas connection to said recess and from said recess to the inner end portion of said cylindrical member, conduit means associated with said valve housing for establishing communication between said recess and the outer end portion of said cylindrical member, valve means movably disposed in said recess for alternately permitting gas flow through said recess to the inner and outer end portions of said cylindrical member through said passages and conduit means respectively, with the gas flow to the inner and outer end portions of said cylindrical member serving to move said pressure responsive member relatively toward and away from said forming machine respectively, means responsive to the position of said pressure responsive member for moving said valve within said recess, and material handling means secured to the outer end of said support member for receiving material from said forming machine when extended thereto.

8. In a material handling apparatus for a forming machine having a movable ram and a stationary bed, a cylindrical member, a pressure responsive member slidably disposed in said cylindrical member and adapted for movement relatively toward and from said forming machine, a supporting member disposed within said cylindrical member with the inner end of said supporting member secured to said pressure responsive member for movement therewith, material handling members secured to the outer end of said supporting member and adapted to handle material from said forming machine when moved to the forming machine and to release the material when moved away from the forming machine, a source of gas pressure, a valve housing secured to the inner end of said cylindrical member, said valve housing being provided with a recess and a connection to the source of gas pressure, said valve housing being further provided with a passage communicating with the gas pressure connection and said recess and a passage communicating with said recess and the inner end of said cylindrical member, conduit means associated with said valve housing for establishing communication between said recess and the outer end of said cylindrical member with said conduit means extenting through said pressure responsive member and coaxially through said cylindrical member, valve means movably disposed in said recess for alternately establishing communication between the gas pressure connection and the inner and outer ends of said cylindrical member through said passage and conduit means respectively, said valve means being normally disposed to establish communication between the gas pressure connection and the inner end of said cylindrical member whereby said pressure responsive member is moved to the forming machine, means for moving said valve means in said recess when said pressure responsive member is moved to the forming machine to establish communication between the gas pressure connection and the outer end of said cylindrical member whereby said pressure responsive member is moved away from said forming machine, and means actuated by the movable ram for operatively connecting said source of gas pressure to said gas connection for a predetermined period of time.

9. In a material handling apparatus for a forming machine or the like, a tubular member, a piston slidably disposed in said tubular member and adapted to be moved relatively to and away from said forming machine, a second tubular member spaced coaxially inwardly from the first tubular member and secured to said piston for movement therewith, a cylinder secured to the outer end of said second tubular member and communicating with said second tubular member, a second piston slidably disposed in said cylinder and having a piston rod secured thereto and extending outwardly therefrom, a pair of jaws secured to said cylinder and disposed to be closed by said piston rod to grip material from the forming machine, biasing means associated with said second piston to oppose outward movement of said second piston, a source of gas, a valve housing secured to the inner end of the first tubular member with said valve housing being provided with a recess and a connection to said source of gas, said valve housing being further provided with passages leading from said gas connection to said recess and from said recess to the inner end portion of the first tubular member, conduit means associated with said valve housing for establishing communication between said recess and the second tubular member, valve means movably disposed in said recess for alternately permitting gas flow through said recess to the inner end of said first tubular member through said passages to establish a pressure buildup in said first tubular member to thereby move said first piston together with said second tubular member to the forming machine and to the second tubular member through said conduit means with the gas flow to the second tubular member establishing a pressure buildup in the second tubular member, said last-mentioned pressure buildup being simultaneously applied to said first and second pistons with said second piston being initially moved outwardly to close said jaws to thereby grip material from the forming machine and with said first piston being subsequently moved inwardly to the inner end of the first tubular member together with said second tubular member, means to relieve the pressure buildup in said second tubular member when the first piston is moved substantially inwardly to permit said jaws to open to thereby release the material, and means for moving said valve within said recess when the first piston is moved to the forming machine to effect gas flow to the second tubular member.

10. In an apparatus adapted to handle a workpiece from a forming machine, a first cylindrical member, a piston disposed in said first cylindrical member and adapted to be moved relatively toward and away from the forming machine, a second cylindrical member disposed within said first cylindrical member and having its inner end secured to said piston for movement therewith, gas actuated gripping means carried by the outer end of said second cylindrical member for gripping a workpiece from the forming machine, a valve housing secured to the inner end of said first cylindrical member and having a connection to a source of gas, said valve housing being provided with a recess and a first passage communicating with said source of gas and the inner end of said first cylindrical member through said recess, conduit means associated with said valve housing and extending coaxially through said first and second cylindrical member and extending through said piston for establishing communication between said recess and said second cylindrical member, valve means movably disposed in said recess for controlling the flow of gas through said recess and being normally disposed to permit gas flow through said first passage and to prevent gas flow through said conduit means whereby gas is admitted to the inner end of said first cylindrical member to thereupon actuate said piston and move the second cylindrical member toward the forming machine together with said gripping means and to provide a presure buildup in the inner end of said cylindrical member, said valve housing being further provided with a second passage communicating with said recess and the inner end of said cylindrical member whereby said pressure buildup therein is applied to said valve means to move the same within the recess whereby gas flow through said first passage is prevented and gas flow through said conduit means is established to provide a pressure buildup in said second cylindrical member, said pressure buildup being equally applied to said piston and to said gripping means with the gripping means being initially actuated to thereby grip the workpiece from the forming machine and with the piston being subsequently actuated to move said second cylindrical member away from the forming machine together with said gripping means, and means to relieve the pressure buildup in the inner end of said first cylindrical member when said valve means is actuated and means to relieve the pressure buildup in the second cylindrical member when said piston is moved substantially away from said forming machine to de-actuate said gripping means to thereby cause said workpiece to be released therefrom.

11. An apparatus adapted to handle material from a forming machine comprising a first tubular member, a first piston slidably disposed in said tubular member and adapted to be moved relatively toward and away from said forming machine, a second tubular member disposed within said first tubular member with the inner end of said second tubular member secured to said first piston for movement therewith, a cylinder secured to the outer end of said second tubular member for movement therewith and disposed to communicate with said second tubular member, a second piston slidably disposed in said cylinder with said second piston being provided with a piston rod extending outwardly therefrom, a pair of jaws secured to said cylinder with one of said jaws being pivotally mounted with respect to the other of said jaws and disposed in alignment with said piston rod whereby as said second piston is moved outwardly within said cylinder, said pivotal jaw is moved relatively toward the other of said jaws to close said jaws and grip material from the forming machine, means associated with said second piston for biasing said second piston inwardly, and means for alternately effecting fluid flow to the inner end of said first tubular member to move said first piston together with said second tubular member to the forming machine and to the second tubular member to establish a pressure buildup in the same, said pressure buildup being equally applied to said first and second piston with the second piston being initially actuated to effect closing of said jaws and with said first piston being subsequently actuated to move said first piston together with said second tubular member away from the forming machine.

References Cited in the file of this patent

UNITED STATES PATENTS

| | | |
|---|---|---|
| 1,679,527 | Jaeger | Aug. 7, 1928 |
| 2,268,075 | Langer | Dec. 30, 1941 |
| 2,763,229 | Sahlin | Sept. 18, 1956 |
| 2,811,266 | Udal | Oct. 29, 1957 |